United States Patent [19]

Julian

[11] 4,419,424

[45] Dec. 6, 1983

[54] ELECTRODES FOR ELECTROCHEMICAL CELLS CURRENT GENERATING CELLS AND RECHARGEABLE ACCUMULATORS

[76] Inventor: John D. Julian, Flötzersteig 203, Vienna A-1140, Austria

[21] Appl. No.: 286,571

[22] Filed: Jul. 14, 1981

[51] Int. Cl.³ .............................................. H01M 4/62
[52] U.S. Cl. ..................................... 429/217; 429/221
[58] Field of Search ............... 429/212, 214, 215, 216, 429/217, 221

[56] References Cited

U.S. PATENT DOCUMENTS

| | | | |
|---|---|---|---|
| 3,060,254 | 10/1962 | Urry | 429/235 |
| 3,400,020 | 9/1968 | Carpino et al. | 429/217 |
| 3,565,694 | 2/1971 | Chireau | 429/217 |
| 4,069,373 | 1/1978 | Gabano | 429/217 |

*Primary Examiner*—Donald L. Walton
*Attorney, Agent, or Firm*—Kurt Kelman

[57] ABSTRACT

Electrodes using essentially insoluble active material are disclosed which can be used in a variety of electrochemical cells and rechargeable accumulators. Plastic materials are used to ensure porosity and strength and to sinter the electrode ingredients and active material together. Details of the essentially insoluble compound active material are disclosed and of an electrolyte recommended for use with the electrodes. Aspects of this invention are applicable particularly to Ni-Cd, Ag-Cd, Ag-Zn, Ni-Fe, Ni-Zn, Metal-Air, fuel or solar cells.

10 Claims, No Drawings

ELECTRODES FOR ELECTROCHEMICAL CELLS CURRENT GENERATING CELLS AND RECHARGEABLE ACCUMULATORS

This invention relates to light weight electrodes which can be manufactured in a simple yet effective manner with the use of modern plastic materials used to reinforce and hold together the active materials in a resilient porous coherent structure, to the use of essentially insoluble ferri-ferro-cyanide compounds as active material and to the preferred electrolyte composition for use with the electrodes of this invention. Certain metallic powders and other materials are used as current collecting, conductivity enhancing and support materials in conjunction with plastic binding and filling materials.

Various studies have shown that only a part of the active materials available in electrode structures used in electrochemical cells is effectively utilised in the electrochemical reactions involved in the charge/discharge process. In an effort to make more of the active material available, it has long been common practice to add sponge iron, graphite, rubber or cellulosic materials to improve conductivity and to maintain the metallic active material granules apart in a porous structure. This has been proposed in an effort to avoid electrode particles coagulating together, with the consequent loss of active surface area, and to facilitate access of electrolyte and charge transfer reactions to penetrate deeper into the electrode structure. Depositing the active material into the pores of a highly porous support material to spread it out over a much larger surface area than if compacted together is used to advantage in sintered electrodes even though the processes used tend to be rather expensive, laborious and time consuming in production.

Prior art electrodes of the pocket and tubular structure types are well known and have been used for both anodic negatives and cathodic positives with Fe, Cd, Ni, etc. electrodes. The electrode active material mix is enclosed in a perforated metallic housing which holds it together and acts as a current collector and mechanical support. Other methods of production for Pb, Zn, Ag, etc. electrodes have used compression of the dry powder in a form or mould or the slurry pasting method over a grid support, electroforming, etc.

Some pasted and pressed and other sintered types have also been produced mainly for fuel cell applications:

U.S. Pat. No. 3,725,129 to J. G. Ruzzo Jr., Apr. 3, 1972, refers to pasted nickel hydroxide electrodes using polyvinylpyrolidone as a binding agent.

U.S. Pat. No. 3,338,751 to W. A. B. Barber, Aug. 29, 1967, refers to electrodes made from nickel formate and a mineral oil paste with PTFE or PCTFE emulsion cured at 225°–350° C. in a nitrogen or argon atmosphere.

Other forms of sintered or compressed powder electrodes on wire mesh current collectors or frames have also been tried but most show little or no improvement on earlier types or else suffer from flaking or rapidly deteriorate in deep discharge recycling in use. Some of the high temperature sintering curing techniques requiring special reducing or neutral atmospheres can also be rather costly and difficult to adapt to continuous large scale production.

More recently, other more involved processes have been tried, such as diffusion bonded plaques.

U.S. Pat. No. 3,702,019 to W. Pollack, Nov. 7, 1972, discloses where porous plaques made up of a compressed mat or felt of short metal fibres sintered together for later impregnation and forming.

U.S. Pat. No. 3,689,320 to T. B. Ashcroft, W. Butteridge and V. A. Tracey, Sept. 5, 1972, discloses cotton and fabric threads or cloth impregnated with a solution of the active material and then sintered at some 800°–1200° C. in a hydrogen or cracked ammonia atmosphere to burn out the fabric and sinter the active material together.

Electrode support materials generally used have been silver or silver plated, nickel or nickel plated materials for the cathodic positive electrode and iron, copper, brass, silver or silver plated materials for the anodic negative electrodes or else the more elaborate sintered nickel plaques of porous type used particularly for the cathodic positive or for both electrodes in some alkaline cells. Zinc electrodes of the prior art have usually been made by compressing a dry powder in a form by the slurry paste method or by electroforming. Other methods more recently used have been:

U.S. Pat. No. 3,663,297 to R. D. Willer, May 16, 1972, discloses the use of sintered zinc powder.

U.S. Pat. No. 3,671,391 to F. C. Arrance, June 20, 1972 discloses zinc oxide and zirconium oxide powder mixed together and sintered at high temperatures.

Several problems arise with the use of cadmium, zinc or similar electrodes in rechargeable cells, mainly due to their solubility during discharge in the electrolyte. Some of these problems are dendrite formation, shape change, oxide deposition and the tendency not to replate satisfactorily on recharge, resulting in early failure of the cell due to separator penetration and short circuiting of the electrodes. These problems have not yet been adequately solved by previous state of the art methods. Various electrolyte compositions and additives have been tried including potassium borate, F. A. Schneider and Z. Dominiczak Technische Hogeschool, Eindhoven, Holland.

U.S. Pat. No. 3,775,183 uses ethoxylated resin amine. Special separators have also been used:

U.S. Pat. No. 3,661,645 May 9, 1972, to M. P. Strier and J. S. Smatko discloses microporous separators made of a flexible PTFE film.

U.S. Pat. No. 3,703,414 to, J. S. Smatko refers to sintered olivine separators made by sintering a compacted magnesium silicate iron silicate composition.

These and other similar means of trying to delay the dendrite growths from the zinc material, shape change or other detrimental effects, such as silver migration, etc. have so far been only partially successful in retarding eventual and inevitable cell failure.

Other means of tackling the problems, such as U.S. Pat. No. 4,052,541 Oct. 4, 1977, proposing vibrating the zinc electrode or German Pat. No. 23.64 203 disclosing zinc electrode enclosed behind a fine mesh screen coated with a hydrogen evolving layer, as Raney nickel etc., have likewise only been partially successful.

This invention relates to a simple yet effective way of overcoming the above drawbacks by providing light weight electrodes containing modern plastic materials. The electrodes can be of various types both anodic negative and cathodic positive electrodes with active materials, as for instance Al, Cd, Fe, Zn, Ni, Co, Cu, Ag, Pb, etc., or for fuel cells, metal air cells, solar cells etc.

Electrodes of the present invention have metallic powders and, if desired, other powders contained in the electrode sintered together with an electrolyte resistant ethylene- or polyethylene-vinylacetate powder material which does not react chemically with the other ingredients and has a sintering temperature which avoids oxidation or chemical deterioration of the active material.

An important point in choosing the plastic powder binder of this invention is that the softening and sintering temperature of the plastic powder be so chosen that no melting deterioration or chemically deleterious reactions occur in the active materials concerned. At the same time, the plastic materials chosen must be resistant to and not react chemically with the ingredients or electrolyte, either in the manufacturing process or in use afterwards. This is particularly important with cadmium and zinc electrodes as some of these powders tend to be pyrophoric and prone to oxidise rapidly at quite moderate temperatures, not to mention their low melting points which are rather too close for comfort to that of many otherwise useful plastic materials.

In order to reinforce larger sized electrodes, an electrode according to the present invention may also contain plastic fibres and/or glass fibres or both.

The support and current collectors can be in the form of wire mesh or expanded metal sheet or frame of any convenient form or as currently used in electrode structures. Other metals and powders are used as current collecting, conductivity enhancing support and filler materials together with plastic materials used to enhance porosity and to hold the active materials together. The process or ingredients used do not require any particularly high temperatures for curing or any special reducing or neutral atmospheres for sintering. The process can further readily be adapted to small medium or large scale production or to fully automated continuous production lines.

Nickel based cathodic positive electrodes based on this invention would preferably use a nickel plated current collector and be pasted with a paste made up of nickel cobalt barium hydroxide powders, nickel or graphite powders, suitable electrolyte resistant plastic fibres, such as polypropylene or glass fibres, and a suitable electrolyte resistant plastic powder binder, such as polyethylene vinylacetate pressed together and sintered to form a porous yet coherent structure.

Zinc based essentially insoluble anodic negative electrodes based on this invention would preferably use a stainless steel carbon silicon manganese based or titanium zirconium alloyed current collector and be pasted with a paste made up of a zinc ferri-ferro-cyanide compound powder, titanium, zirconium, PTFE, mercury oxide, powders, suitable electrolyte resistant plastic fibres, such as polypropylene or glass fibres, and a suitable electrolyte resistant plastic powder binder, such as polyethylene vinylacetate pressed together and sintered to form a porous yet coherent structure.

The choice of plastic fibres, plastic filler and the plastic powder binder should be such as to provide a sufficiently wide difference in the melting index softening and sintering temperatures to ensure that the fibres and filler remain essentially intact and unmelted at the temperature required to sinter the plastic binder powder and electrode materials together.

It has been found that the solubility of elements, such as Cd and Zn, etc., in the electrolytes most commonly used is the cause of most of the major problems encountered with cells using such electrodes. The use of ferricyanides and borates in the electrolyte greatly modifies and reduces such solubility and using such an electrolyte containing ferri-cyanides allows the use of ferrocyanide compounds for the active electrode materials. Such compounds are essentially insoluble in dilute alkaline ferricyanide and borate solution which are recommended for use as electrolytes with the electrodes of this invention.

Thus the present invention further provides electrodes for electrochemical cells which contain a ferriferro-cyanide compound such as a zinc-ferrocyanide compound for the active electrode material. Said electrodes may be of the type described above, i.e. they may have metallic powders and if desired other powders sintered with a plastic powder as defined before.

It has further been found that nickel or nickel plated supports or current collectors can be satisfactorily used for the cathodic positive electrodes but that a more suitable and cheaper than silver or silver plated material for the anodic negative electrodes according to this invention is a stainless steel carbon silicon manganese based or titanium zirconium alloy.

The essentially insoluble ferri-ferro-cyanide compound based rechargeable anodic negative electrodes of this invention would preferably use such a stainless steel current collector or frame and would be pasted with a paste made up of a suitable ferri-ferro-cyanide compound powder, titanium, zirconium, PTFE or similar powders, suitable electrolyte resistant plastic fibres, such as polypropylene or glass fibres, and a suitable electrolyte resistant powder as binder, such as polyethylene vinylacetate pressed together and then sintered to form a porous and yet coherent structure.

In the examples that follow the proportions of the various ingredients can be varied widely as these will depend upon the capacity range and porosity of the electrode desired and the press pressure used, etc. The plastic or glass fibres are mainly used to reinforce and strengthen larger thicker electrodes and can be omitted from smaller thinner electrodes.

EXAMPLE 1

Example of a nickel hydroxide based electrode.

| Typical ingredients: | Weight % range | Preferred % typical |
| --- | --- | --- |
| Nickel hydroxide | 13–30% | 25% |
| Nickel powder | 35–75% | 65.5% |
| Graphite powder | 0–5% | 0. |
| Cobalt hydroxide | 0–5% | 0. |
| Barium hydroxide | 0–5% | 2.5% |
| Polypropylene or glass fibres | 0–0.25% | 0. |
| Polyethylene vinyl-acetate powder | 4–10% | 7. |

Wetted to a thick doughy paste with a solution of:
3.8 grams 85% KOH pellets
0.8 grams potassium ferricyanide
100 ml water.

Press pressure 300–2000 Kg/cm$^2$ (30–200 MPa).

Sintering for 15–45 mins. at 90°–150° C. or as appropriate for the polyethylene vinylacetate powder. Polyethylene vinylacetate or other plastic powders used for binding requiring temperatures for sintering much above 180° C. should preferably not be used to avoid nickel hydroxide deterioration.

EXAMPLE 2

Similarly a cobalt (Co) based electrode can be prepared by replacing the nickel powders in example 1 for appropriate cobalt hydroxide and cobalt powders.

EXAMPLE 3

Similarly a silver (Ag) based electrode can be prepared by replacing the nickel powders in example 1 for appropriate silver oxide and silver powders or mixtures thereof as required and omitting the cobalt and barium etc.

Other possible electrodes and electrode mixtures may well occur to those skilled in the art and used in this manner without in any way detracting from the spirit of the invention.

EXAMPLE 4

Example of a zinc based electrode.

Zinc, zirconium or titanium, graphite, mercury oxide, PTFE powders, polypropylene or glass fibres, polyethylene vinylacetate powders are all mixed together and compacted into a suitable mould for compression or compressed between rollers together with a suitable current collector or frame and sintered.

| Typical ingredients | Weight % range | Preferred % typical |
|---|---|---|
| Zinc powder | 80-95% | 88.9% |
| Mercury oxide | 0-3% | 1% |
| PTFE powder | 0-5% | 1% |
| Zirconium titanium or graphite | 0-5% | 0 |
| Polypropylene or glass fibres | 0-0.25% | 0.1% |
| Polyethylene vinyl-acetate powder | 1-18% | 9% |

Pressed essentially dry or slightly moistened with a solution as in Example 1.

Press pressure 300–1500 Kg/cm$^2$ (30–150 MPa); Sintering for 15–45 mins. at 90°–150° C. or as appropriate for the polyethylene vinylacetate powder used.

With the temperatures given here, no particular problems are encountered with zinc powder oxidation or pyrophoricity, particularly if the electrodes remain in reasonably close fitting moulds during sintering and initial cooling afterwards. Should the electrodes be required for use at a later date, the usual precautions customary with zinc electrodes should be adopted for dry storage in reasonably airtight packings.

EXAMPLE 5

Example of essentially insoluble rechargeable zinc-ferrocyanide electrode. A zinc ferrocyanide compound, zirconium or titanium, graphite, PTFE powders, polypropylene or glass fibres, polyethylene vinylacetate powder are all mixed together and compacted into a suitable mould for compression or compressed between rollers together with a suitable current collector or frame and sintered.

| Typical ingredients | Weight % range | Preferred % typical |
|---|---|---|
| Zinc ferrocyanide compound | 80-95% | 88.9% |
| Mercury oxide | 0-3% | 1% |
| Teflon PTFE powder | 0-5% | 1% |
| Zirconium, titanium or graphite | 0-5% | 0. |
| Polypropylene or glass fibres | 0-0.2% | 0.1% |
| Polyethylene vinylacetate | 1-15% | 9% |

Pressed essentially dry or slightly moistened with a solution as in Example 1.

Press pressure 300–1500 Kg/cm$^2$ (30–150 MPa)

Sintering for 15–45 mins. at 90°–150° C. or as appropriate for the polyethylene vinylacetate powder used.

The ferricyanide content of the zinc compound suitable for use in the essentially insoluble rechargeable electrode of this invention can vary and is not particularly critical. A simple method for preparing a suitable zinc ferrocyanide compound powder is as follows:

Stir some 20 grams of zinc powder, 250 mesh 60 μm, into a solution of:

19 grams 85% KOH pellets
4 grams potassiumferricyanide
per 100 ml water.

Stir occasionally, adding more potassiumferricyanide as it is absorbed by the zinc as indicated by the loss of coloration. Some 4 to 6 times the weight of the zinc powder in potassiumferricyanide can be stirred in in this manner. The solution is eventually drained or centrifuged off, the compound powder collected and washed till the wash water is free of alkalinity to phenophtalein, dried and is ready for use.

Alternatively, an equivalent amount of zinc ferrocyanide white powder $Zn_2Fe(CN)_6$, prepared from a zinc salt and ferrocyanide or a mixture of the compound as prepared before and of zinc ferrocyanide white can be used together. Other methods of preparation of zinc ferri-ferro-cyanide compounds may well occur to those skilled in the art and, as mentioned before, the actual ferricyanide content is not particularly critical.

Cell construction and electrolyte

The electrodes of this invention can be used as per usual alkaline cell practice for assembly into cells. Some 2-3 layers of a woven nylon material or a non-woven separator pocket for the zinc-ferrocyanide compound electrode are recommended thin microporous absorbent separator can, if desired, be added to the cathodic positive electrode side. Stacking pressures of some 10–40 Kg/cm$^2$ (1-4 MPa) have been found beneficial and the electrodes perform also quite well under limited electrolyte and sealed conditions. Normal alkaline cell practice can be followed for most general cell design points, avoiding copper, tin, brass or soldered components.

The electrolyte recommended for use with the zinc-ferricyanide compound and other electrodes of this invention is made up as follows:

19 grams 85% KOH pellets
4 grams potassium ferricyanide $K_3Fe(CN)_6$.
0.6 grams potassiumfluoride KF.
0.6 grams orthoboric acid $H_3BO_3$.
100 ml water.

One to three cycles of normal charge/discharge are to be recommended before assembly with fresh electrolyte.

The ferricyanide content or the other ingredients in the electrolyte or the density are not particularly critical and can be adjusted over a fairly wide range for various specific applications.

I claim

1. An electrode for electrochemical cells, current generating cells and rechargeable accumulators, comprising a current collector and a sintered mixture of a metallic powder and ethylene or polyethylene vinylacetate containing an essentially insoluble ferri- or ferrocyanide compound as active electrode material, the mixture being porous and permeable to electrolyte.

2. The electrode of claim 1, wherein the sintered mixture additionally comprises a plastic filler powder.

3. The electrode of claim 2, wherein the plastic is polytetrafluorethylene.

4. The electrode of claim 1 or 2, wherein the sintered mixture additionally comprises reinforcing fibres.

5. The electrode of claim 4, wherein the fibres are of polypropylene.

6. The electrode of claim 4, wherein the fibres are of glass.

7. The electrode of claim 1, wherein the compound is zinc ferrocyanide.

8. The electrode of claim 1, wherein the sintered mixture additionally contains a compound modifying the conductivity or overpotential of the electrode.

9. The electrode of claim 8, wherein the modifying compound is a transitional element.

10. The electrode of claim 8, wherein the modifying compound is mercury oxide.

* * * * *